United States Patent
Beck et al.

(10) Patent No.: US 11,460,038 B2
(45) Date of Patent: Oct. 4, 2022

(54) HYBRID MAGNETIC RADIAL BEARING IN AN ELECTRIC SUBMERSIBLE PUMP (ESP) ASSEMBLY

(71) Applicant: Halliburton Energy Services, Inc., Houston, TX (US)

(72) Inventors: David Christopher Beck, Broken Arrow, OK (US); Christopher Watson, Claremore, OK (US); Robert C. de Long, Sand Springs, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 317 days.

(21) Appl. No.: 16/886,213

(22) Filed: May 28, 2020

(65) Prior Publication Data
US 2021/0372471 A1    Dec. 2, 2021

(51) Int. Cl.
*F04D 29/048*    (2006.01)
*F16C 32/04*    (2006.01)
(Continued)

(52) U.S. Cl.
CPC ............ *F04D 29/048* (2013.01); *E21B 43/00* (2013.01); *E21B 43/128* (2013.01); *F04D 13/0633* (2013.01); *F04D 13/08* (2013.01); *F04D 13/086* (2013.01); *F04D 13/10* (2013.01); *F04D 19/048* (2013.01); *F04D 25/06* (2013.01);
(Continued)

(58) Field of Classification Search
CPC .... F04D 29/058; F04D 29/048; F04D 19/048; F04D 13/10; F04D 25/06; F04D 25/0606; F04D 25/0686; F04D 29/04; F04D 29/057; F04D 13/086; F04D 13/0633; F04D 13/08; F04D 1/00; F16C 2360/44; F16C 32/0425; F16C 32/0402; F16C 32/0408; F16C 32/0423; F16C 32/048; F16C 2360/00; H02K 7/09; H02K 5/132; H02K 5/1285; E21B 43/128; E21B 43/00
See application file for complete search history.

(56) References Cited

U.S. PATENT DOCUMENTS

| 3,233,950 A | 2/1966 | Baermann |
| 4,128,280 A | 12/1978 | Purtschert |

(Continued)

FOREIGN PATENT DOCUMENTS

| AU | 2009244521 A1 | 11/2009 |
| CA | 2492069 A1 | 1/2004 |

(Continued)

OTHER PUBLICATIONS

Foreign Communication from Related Application—International Search Report and Written Opinion of the International Searching Authority, International Application No. PCT/US2020/039182, dated Feb. 22, 2021, 11 pages.

(Continued)

*Primary Examiner* — Peter J Bertheaud
(74) *Attorney, Agent, or Firm* — Conley Rose, P.C.; Rodney B. Carroll (57) ABSTRACT

An electric submersible pump (ESP) assembly. The ESP assembly comprises an electric motor, a centrifugal pump, and a hybrid magnetic radial bearing, wherein the hybrid magnetic radial bearing is disposed inside the electric motor or disposed inside the centrifugal pump.

20 Claims, 8 Drawing Sheets

(51) Int. Cl.

| | | |
|---|---|---|
| *E21B 43/12* | (2006.01) | |
| *F04D 13/08* | (2006.01) | |
| *H02K 7/09* | (2006.01) | |
| *H02K 5/132* | (2006.01) | |
| *F04D 13/10* | (2006.01) | |
| *F04D 29/04* | (2006.01) | |
| *F04D 29/057* | (2006.01) | |
| *F04D 25/06* | (2006.01) | |
| *F04D 29/058* | (2006.01) | |
| *F04D 19/04* | (2006.01) | |
| *H02K 5/128* | (2006.01) | |
| *E21B 43/00* | (2006.01) | |
| *F04D 13/06* | (2006.01) | |
| *F04D 1/00* | (2006.01) | |

(52) U.S. Cl.
CPC ..... *F04D 25/0606* (2013.01); *F04D 25/0686* (2013.01); *F04D 29/04* (2013.01); *F04D 29/057* (2013.01); *F04D 29/058* (2013.01); *F16C 32/0402* (2013.01); *F16C 32/048* (2013.01); *F16C 32/0408* (2013.01); *F16C 32/0423* (2013.01); *F16C 32/0425* (2013.01); *H02K 5/1285* (2013.01); *H02K 5/132* (2013.01); *H02K 7/09* (2013.01); *F04D 1/00* (2013.01); *F16C 2360/00* (2013.01); *F16C 2360/44* (2013.01)

(56) References Cited

U.S. PATENT DOCUMENTS

| | | | |
|---|---|---|---|
| 4,379,598 A | 4/1983 | Goldowsky | |
| 4,948,348 A * | 8/1990 | Doll | F04D 29/048 417/423.12 |
| 5,127,792 A * | 7/1992 | Katsuta | F16C 32/0476 415/107 |
| 5,495,221 A | 2/1996 | Post | |
| 5,749,700 A | 5/1998 | Henry et al. | |
| 6,255,752 B1 * | 7/2001 | Werner | F16C 32/0692 310/90.5 |
| 6,545,378 B2 | 4/2003 | Chen et al. | |
| 6,641,378 B2 * | 11/2003 | Davis | F04D 29/048 417/410.5 |
| 6,657,344 B2 | 12/2003 | Post | |
| 6,700,258 B2 | 3/2004 | McMullen et al. | |
| 6,727,617 B2 | 4/2004 | McMullen et al. | |
| 6,965,181 B1 | 11/2005 | Heshmat et al. | |
| 8,330,455 B2 | 12/2012 | Duppe et al. | |
| 8,696,331 B2 * | 4/2014 | Cunningham | F04D 13/10 417/423.12 |
| 10,145,224 B1 * | 12/2018 | Shenoy | H02K 21/14 |
| 2003/0155829 A1 | 8/2003 | McMullen et al. | |
| 2004/0113502 A1 | 6/2004 | Li et al. | |
| 2004/0234391 A1 | 11/2004 | Izraelev | |
| 2006/0037743 A1 | 2/2006 | Head | |
| 2006/0110271 A1 | 5/2006 | Klabunde et al. | |
| 2006/0279149 A1 | 12/2006 | Asper | |
| 2007/0280571 A1 | 12/2007 | Satoji et al. | |
| 2008/0111434 A1 | 5/2008 | Head | |
| 2008/0284268 A1 | 11/2008 | Yuratich et al. | |
| 2011/0052432 A1 | 3/2011 | Cunningham et al. | |
| 2012/0107143 A1 | 5/2012 | Gilarranz et al. | |
| 2014/0347152 A1 | 11/2014 | Aronstam et al. | |
| 2015/0349603 A1 | 12/2015 | Parmeter | |
| 2016/0190893 A1 | 6/2016 | Parmeter et al. | |
| 2018/0100543 A1 | 4/2018 | Hyatt et al. | |
| 2018/0180049 A1 * | 6/2018 | McMullen | F04D 13/0633 |
| 2019/0085671 A1 | 3/2019 | Biddick et al. | |

FOREIGN PATENT DOCUMENTS

| | | |
|---|---|---|
| CN | 101846131 A | 9/2010 |
| CN | 201726242 U | 1/2011 |
| CN | 104696262 A | 6/2015 |
| EP | 0355796 A2 | 2/1990 |
| EP | 0523002 A1 | 1/1993 |
| EP | 0566806 A1 | 10/1993 |
| EP | 2300687 B1 | 12/2018 |
| JP | 3121819 B2 | 1/2001 |
| WO | 2014133397 A1 | 9/2014 |
| WO | 2018071478 A1 | 4/2018 |

OTHER PUBLICATIONS

International Search Report and Written Opinion of the International Searching Authority, International Application No. PCT/US2020/035715, dated Nov. 30, 2020, 12 pages.

International Search Report and Written Opinion of the International Searching Authority, International Application No. PCT/US2020/035719, dated Nov. 30, 2020, 12 pages.

Office Action (34 Pages), dated Mar. 8, 2022, U.S. Appl. No. 16/899,771, filed Jun. 12, 2020.

Electronic Acknowledgement Receipt, Specification and Drawing for U.S. Appl. No. 16/886,208, filed May 28, 2020, titled "Shielding for a Magnetic Bearing in an Electric Submersible Pump (ESP) Assembly," 46 pages.

Filing Receipt, Specification and Drawing for U.S. Appl. No. 16/899,771, filed Jun. 12, 2020, titled "Hybrid Magnetic Thrust Bearing in an Electric Submersible Pump (ESP) Assembly," 46 pages.

Electronic Acknowledgement Receipt, Specification and Drawings for International Application No. PCT/US2020/035719, filed Jun. 2, 2020, entitled "Shielding for a Magnetic Bearing in an Electric Submersible Pump (ESP) Assembly," 43 pages.

Electronic Acknowledgement Receipt, Specification and Drawings for International Application No. PCT/US2020/035715, filed Jun. 2, 2020, entitled "Hybrid Magnetic Radial Bearing in an Electric Submersible Pump (ESP) Assembly," 39 pages.

Electronic Acknowledgement Receipt, Specification and Drawings for International Application No. PCT/US2020/039182, filed Jun. 23, 2020, entitled "Hybrid Magnetic Thrust Bearing in an Electric Submersible Pump (ESP) Assembly," 42 pages.

* cited by examiner

HYBRID MAGNETIC RADIAL BEARING IN AN ELECTRIC SUBMERSIBLE PUMP (ESP) ASSEMBLY

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Electric submersible pump (ESP) assemblies are used to artificially lift fluid to the surface in deep wells such as oil or water wells. A typical ESP assembly comprises, from bottom to top, an electric motor, a seal unit, a pump intake, and a centrifugal pump, which are all mechanically connected together with shafts and shaft couplings. The electric motor supplies torque to the shafts, which provides power to the centrifugal pump. The electric motor is isolated from a wellbore environment by a housing and by the seal unit. The seal unit acts as an oil reservoir for the electric motor. The oil functions both as a dielectric fluid and as a lubricant in the electric motor. The seal unit also may provide pressure equalization between the electric motor and the wellbore environment. The centrifugal pump transforms mechanical torque received from the electric motor via a drive shaft to fluid pressure to lift fluid up the wellbore. The electric motor is generally connected to a power source located at the surface of the well using a cable and a motor lead extension. The ESP assembly is placed into the well, usually inside a well casing. In a cased completion, the well casing separates the ESP assembly from the surrounding formation. Perforations in the well casing allow well fluid to enter the well casing and flow to the pump intake.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

As used herein, orientation terms "upstream," "downstream," "up," and "down" are defined relative to the direction of flow of well fluid in the well casing. "Upstream" is directed counter to the direction of flow of well fluid, towards the source of well fluid (e.g., towards perforations in well casing through which hydrocarbons flow out of a subterranean formation and into the casing). "Downstream" is directed in the direction of flow of well fluid, away from the source of well fluid. "Down" is directed counter to the direction of flow of well fluid, towards the source of well fluid. "Up" is directed in the direction of flow of well fluid, away from the source of well fluid.

Rotating components of electric submersible pump (ESP) assemblies may be radially stabilized by radial bearings. As used herein, radially stabilizing rotating ESP components means maintaining a central axis of the rotating component substantially in coincidence with a central axis of surrounding static components of the ESP assembly. For example, radially stabilizing an electric motor means maintaining a central axis of a rotor of the electric motor substantially coincident with a central axis of a surrounding stator of the electric motor; radially stabilizing a centrifugal pump means maintaining a central axis of an impeller of the centrifugal pump substantially coincident with a central axis of a surrounding diffuser of the centrifugal pump. It is understood that radial stabilization includes some limited deviation between the central axes of the rotating components and of the surrounding static components. For example, in an embodiment, radial stabilization may maintain the axes of the rotating components within less than 2 mils of each other. For example, in an embodiment radial stabilization may maintain the axes of the rotating components within less than 50% of a maximum deviation of axes allowed before surfaces contact each other.

Wear and tear on ESP assembly radial bearings effect the longevity of the ESP assemblies. Premature wear of ESP assembly radial bearings may entail pulling ESP assemblies out of a wellbore for replacement more frequently and lead to increased non-producing down time as well as increased costs related to servicing the ESP assembly at the well site and increased equipment costs. The present disclosure teaches use of hybrid magnetic radial bearings to increase radial stability of rotating components of ESP assemblies and thereby extend the service life of the ESP assemblies.

The hybrid magnetic radial bearing taught herein provides coarse radial stabilization through magnetic interactions of a magnetic element in a bearing sleeve with a magnetic element in a bearing bushing and provide fine radial stabilization through fluid film mechanical forces. The bearing surfaces of the hybrid magnetic radial bearing are machined to a high grade of smoothness to provide the fluid film mechanical forces engaged in fine stabilization. It is thought that dimensional tolerances of the hybrid magnetic radial bearings taught herein may be increased relative to dimensional tolerances of conventional bearings (e.g., bearings which do not operate based on magnetic forces and rely solely on fluid film force for radial stability). Relaxed dimensional tolerances and relaxed smoothness tolerances can reduce the costs of manufacturing the hybrid magnetic radial bearing relative to conventional bearings machined to tighter dimensional tolerances. In some cases, relaxed dimensional tolerances, for example tolerances for a gap between the bearing surfaces of the sleeve and bushings of the hybrid magnetic radial bearing, can reduce the deleterious wear effects caused by abrasive particles that can be encountered in the downhole environment. A hybrid magnetic radial bearing used in centrifugal pumps that employ reservoir fluid to lubricate the bearings may be designed to have a bigger gap between the bearing surfaces than is customary in traditional radial bearings relying solely on fluid film mechanical forces for radial stabilization.

Figure 1:
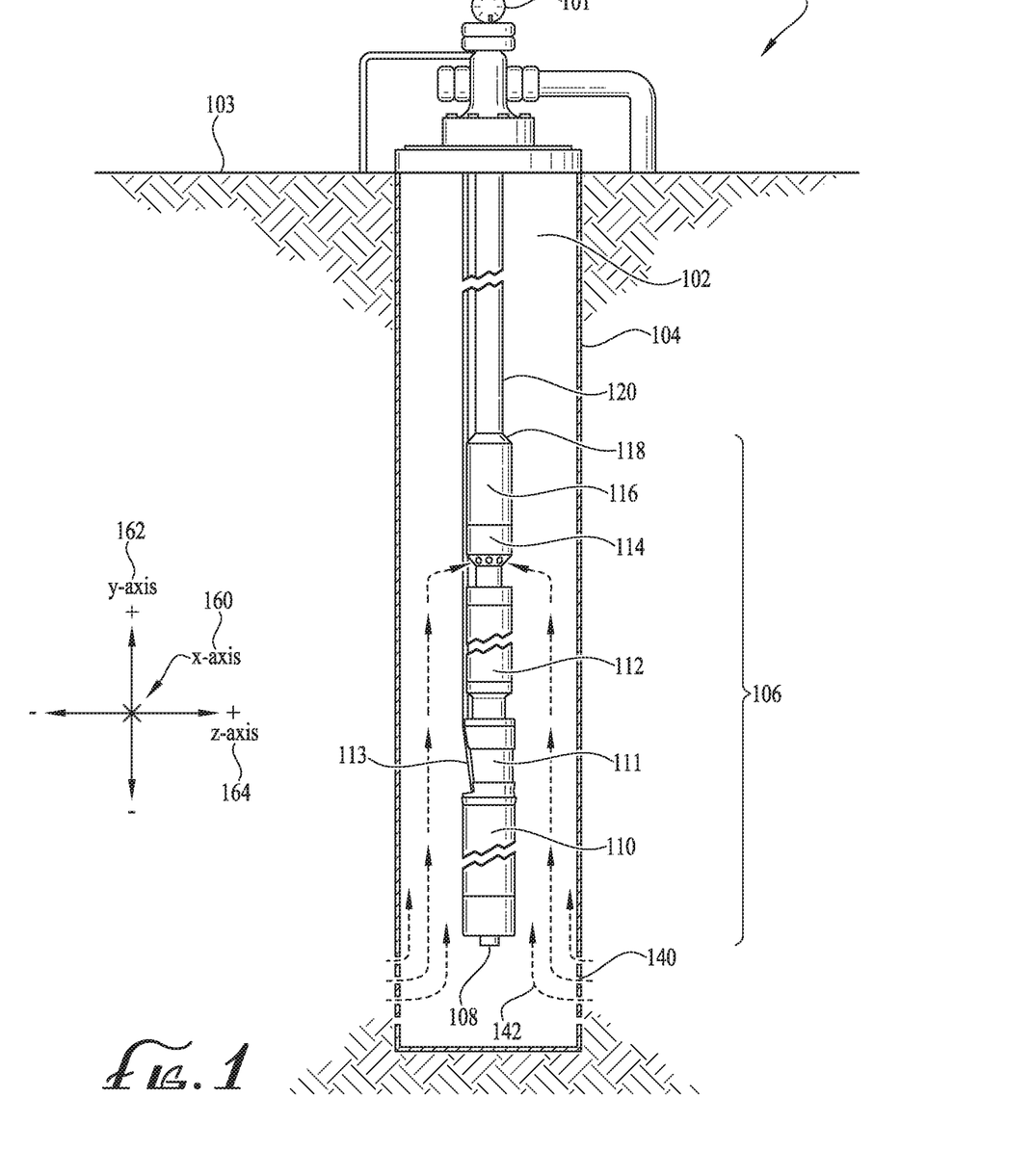
FIG. 1 is an illustration of an electric submersible pump (ESP) assembly disposed in a wellbore according to an embodiment of the disclosure.

Turning now to FIG. 1, a producing well environment 100 is described. In an embodiment, the environment 100 comprises a wellhead 101 above a wellbore 102 located at the surface 103. A casing 104 is provided within the wellbore 102. FIG. 1 provides a directional reference comprising three coordinate axes—an X-axis 160 where positive displacements along the X-axis 160 are directed into the sheet and negative displacements along the X-axis 160 are directed out of the sheet; a Y-axis 162 where positive displacements along the Y-axis 162 are directed upwards on the sheet and negative displacements along the Y-axis 162 are directed downwards on the sheet; and a Z-axis 164 where positive displacements along the Z-axis 164 are directed rightwards on the sheet and negative displacements along the Z-axis 164 are directed leftwards on the sheet. The Y-axis 162 is about parallel to a central axis of a vertical portion of the wellbore 102

An electric submersible pump (ESP) assembly 106 is deployed within the casing 104 and comprises an optional sensor unit 108, an electric motor 110, a motor head 111, a seal unit 112, an electric power cable 113, a pump intake 114, a centrifugal pump 116, and a pump outlet 118 that couples the pump 116 to a production tubing 120. The motor head 111 couples the electric motor 110 to the seal unit 112. The electric power cable 113 may connect to a source of electric power at the surface 103 and to the electric motor 110. The casing 104 is pierced by perforations 140, and reservoir fluid 142 flows through the perforations 140 into the wellbore 102. The fluid 142 flows downstream in an annulus formed between the casing 104 and the ESP assembly 106, is drawn into the pump intake 114, is pumped by the centrifugal pump 116, and is lifted through the production tubing 120 to the wellhead 101 to be produced at the surface 103. The fluid 142 may comprise hydrocarbons such as oil and/or gas. The fluid 142 may comprise water. The fluid 142 may comprise both hydrocarbons and water. In an embodiment, one or more of the electric motor 110, the seal unit 112, the centrifugal pump 116, or a gas separator (not shown) may be provided with hybrid magnetic radial bearings.

Figure 2:
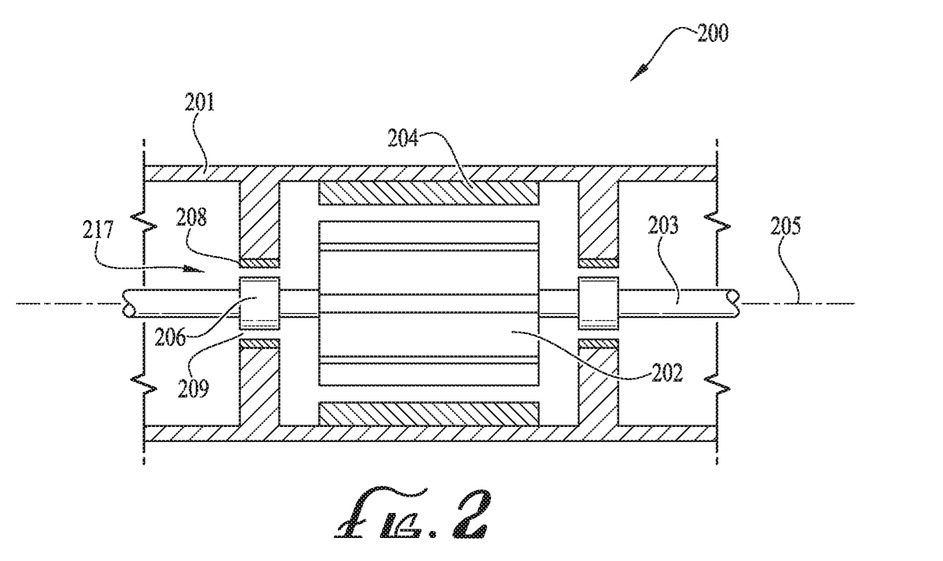
FIG. 2 is an illustration of a rotor of an electric motor radially stabilized by hybrid magnetic radial bearings according to an embodiment of the disclosure.

Turning now to FIG. 2, an electric motor 200 radially stabilized by hybrid magnetic radial bearings is described. The motor 200 comprises a housing 201, a rotor 202 coupled to a drive shaft 203, and a stator 204. The rotor 202 and drive shaft 203 have a center axis 205. The drive shaft 203, and hence the rotor 202 coupled to the drive shaft 203, is radially stabilized at a left side of the rotor 202 by a hybrid magnetic radial bearing 217 comprising a bearing sleeve 206 and a bearing bushing 208. The drive shaft 203 is radially stabilized at a right side of the rotor 202 by another hybrid magnetic radial bearing. A gap 209 is typically present between the bearing surface of the bearing sleeve 206 (outwards facing surface of the bearing sleeve 206) and the bearing surface of the bearing bushing 208 (inwards facing surface of the bearing bushing 208).

As the interaction of the magnetic fields in the stator 204 and the rotor 202 cause the rotor 202 to turn about the center axis 205, mechanical torque is delivered to the drive shaft 203. The drive shaft 203 then transfers this mechanical torque directly or indirectly to other parts of the ESP assembly 106, for example to the pump 116. The rotation of the rotor 202 and the drive shaft 203 can be associated with vibrations or perturbations that cause the center axis 205 of the drive shaft 203 to displace relative to the housing 201 and/or the stator 204. The hybrid magnetic radial bearing 217 acts to radially stabilize the drive shaft 203 and prevent, reduce, or mitigate deviation of the center axis 205. Magnetic forces between the bearing sleeve 206 and the bearing bushing 208, as discussed further hereinafter, provide coarse radial stabilization of the drive shaft 203. Fluid film mechanical forces between the bearing surfaces of the bearing sleeve 206 and the bearing bushing 208 provide fine radial stabilization of the drive shaft 203.

An especially severe radial stabilization challenge may occur during spin-up of the electric motor 200 when an ESP assembly 106 is turned on. During spin-up very high acceleration occurs, and the electric motor 200 may angularly accelerate from 0 RPM to 3600 RPM in a few seconds or even less than a second. During such high acceleration, electric motor side loading forces may be experienced. The hybrid magnetic radial bearings taught herein can desirably augment radial stabilization force provided by fluid film mechanical forces with supplemental radial stabilization force provided by magnetic forces, reducing wear and tear on the bearing surfaces of the bearing sleeve 206 and of the bearing bushing 208, thereby extending the life of the electric motor 200 specifically and the ESP assembly 106 generally.

In an embodiment, the bearing sleeve 206 and the bearing bushing 208 may be made of steel or carbide. In an embodiment, the bearing sleeve 206 may be made of bronze. In an embodiment, the bearing sleeve 206 and/or the bearing bushing 208 may be made of abrasion resistant materials.

Figure 3A:
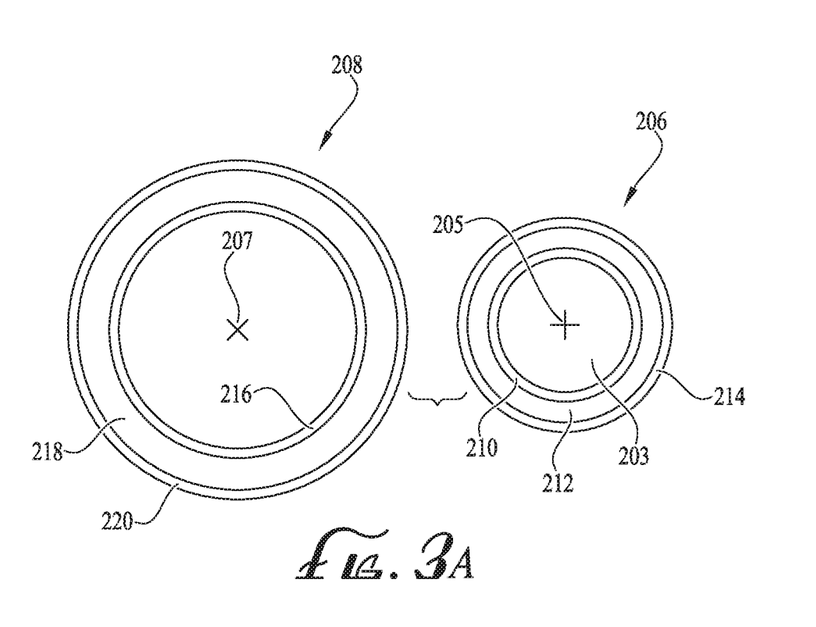
FIG. 3A is a cross-section view of a hybrid magnetic radial bearing bushing and a hybrid magnetic radial bearing sleeve according to an embodiment of the disclosure.

Turning now to FIG. 3A, further details of the bearing sleeve 206 and the bearing bushing 208 are described. In an embodiment, the bearing sleeve 206 comprises an inner sleeve 210, a sleeve magnetic element 212, and an outer sleeve 214. The outer sleeve 214 may provide protection of the sleeve magnetic element 212 and provide a smooth bearing surface for providing fluid film mechanical forces. The outer sleeve 214 may allow magnetic flux of the sleeve magnetic element 212 to pass through it readily or with a low degree of attenuation or interference. In an embodiment, the outer sleeve 214 may be a coating that is applied to the sleeve magnetic element 212 during manufacturing of the bearing sleeve 206. The bearing sleeve 206 has a center axis 205 that may coincide with the center axis 205 of the drive shaft 203.

The bearing sleeve 206 may be press fitted onto the drive shaft 203, where the inside surface of the inner sleeve 210 is in intimate contact with an outside surface of the drive shaft 203. In an embodiment, the outside diameter of the bearing sleeve 206 may be about 1.5 inches, but it is understood that in different ESP assemblies 106 (e.g., ESP assemblies having different diameters) the outside diameter of the bearing sleeve 206 may be different from 1.5 inches. In an embodiment, the width of the bearing sleeve 206 and the bearing bushing 208 may be about 1.5 inches. In other embodiments, however, the width of the bearings sleeve 206 and bearing bushing 208 may be less than or greater than 1.5 inches.

In an embodiment, the bearing bushing 208 comprises an inner sleeve 216, a bushing magnetic element 218, and an outer sleeve 220. The inner sleeve 216 may provide protection of the bushing magnetic element 218 and provide a smooth bearing surface for providing fluid film mechanical forces. The inner sleeve 216 may allow magnetic flux of the bushing magnetic element 218 to pass through it readily or with a low degree of attenuation or interference. In an embodiment, the inner sleeve 216 may be a coating that is applied to the bushing magnetic element 218 during manufacturing of the bearing bushing 208. The bearing bushing 208 has a center axis 207 that coincides with a center axis of the housing 201 of the electric motor 200.

In an embodiment, the inside diameter of the bearing bushing 208 is about 3 mils to 10 mils greater in diameter than the outside diameter of the bearing sleeve 206. In another embodiment, however, the difference between the inside diameter of the bearing bushing 208 and the outside diameter of the bearing sleeve 206 may have a value outside the range of 3 mils to 10 mils. In an embodiment, the difference between the inside diameter of the bearing bushing 208 (e.g., an inside diameter of the inner sleeve 216) and the outside diameter of the bearing sleeve 206 (e.g., an outside diameter of the outer sleeve 214) is greater than the difference that would be seen in conventional radial bearings. It is observed that conventional radial bearings may have a gap of about 2 mils to 3 mils between the bearing bushing and the bearing sleeve. The greater separation between the bearing busing 208 and the bearing sleeve 206 of the hybrid magnetic radial bearing taught herein can provide some benefits of reduced wear in the presence of abrasive particles. In an embodiment, the hybrid magnetic bearing 217 maintains the center axis 205 and the center axis 207 within about 4 mil of each other, within about 3 mill of each other, within about 2.5 mil of each other, within about 2.0 mil of each other, within about 1.5 mil of each other, within about 1.25 mil of each other, within about 1 mil of each other, within about 0.9 mil of each other, within about 0.8 mil of each other, within about 0.7 mil of each other, within about 0.6 mil of each other, within about 0.5 mil of each other, or within some other range of offset variation.

In an embodiment, the surface finish of the bearing surface of the bearing bushing 208 (e.g., the inner surface of the inner sleeve 216) and the bearing surface of the bearing sleeve 206 (e.g., the outer surface of the outer sleeve 214) may be about 20 millionths of an inch of surface variation. In an embodiment, the bearing surface finish of the bearing bushing 208 and the bearing sleeve 206 have a roughness of between 8 micro inches and 22 micro inches. Said in other words, an outer surface of the sleeve 206 (the outer surface of the outer sleeve 214) of the hybrid magnetic radial bearing 217 and an inner surface of the bushing 208 (the inner surface of the inner sleeve 216) of the hybrid magnetic radial bearing 217 have a roughness of between 8 micro inches and 22 micro inches. It is noted that while the tolerance specification of surface finish may be relaxed for the bearing surfaces of the bearing sleeve 206 and of the bearing bushing 208, the surface finish specification tolerance is not dispensed with but rather relaxed. A surface smoothness of 20 millionths of an inch of surface variation, for example, is relaxed with reference to conventional surfaces of bearings engineered for fluid film force exertion but is still a very smooth surface created by precise manufacturing processes.

The magnetic field established by the sleeve magnetic element 212 is directed radially opposite to the direction of the magnetic field established by the bushing magnetic element 218. In this way, the sleeve magnetic element 212 and the bushing magnetic element 218 repel each other, urging the bearing sleeve 206 to be centrally disposed within the bearing bushing 208 and to align the center axis 205 of the drive shaft 203 with the center axis 207 of the bearing bushing 208 and the housing 201 of the electric motor 200 or of the housing of the pump 216 (e.g., when the hybrid magnetic bearing 217 is installed in the pump 216).

If the center axis 205 diverges from the center axis 207, one portion of the bushing magnetic element 218 approaches more closely to a corresponding portion of the sleeve magnetic element 212. Because the force of magnetic repulsion increases or decreases as the separation distance decreases or increases between magnets, an increased force is exerted in alignment with this portion of the sleeve magnetic element 212, and the bearing sleeve 206 is urged away so that the center axis 205 again coincides with the center axis 207.

The bearing sleeve 206 and the bearing bushing 208 are machined and finished so as to provide fluid film mechanical forces to radially stabilize the bearing sleeve 206 within the bushing bearing 208. This is what is meant by referring to the combination of the bearing sleeve 206 with the bearing bushing 208 as a hybrid magnetic radial bearing: the bearing combination provides radial stabilization using both magnetic forces and fluid film mechanical forces. In an embodiment, the magnetic forces may provide coarse radial stabilization of the bearing sleeve 206 and the drive shaft 203, and the fluid film mechanical forces may provide fine radial stabilization of the bearing sleeve 206 and the drive shaft 203.

Figure 3B:
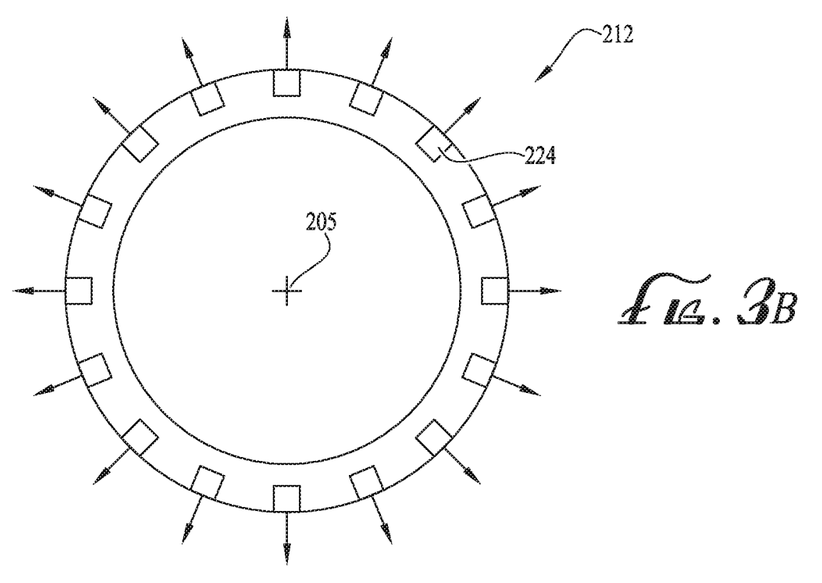
FIG. 3B is a cross-section view of a magnetic element of a hybrid magnetic radial bearing sleeve according to an embodiment of the disclosure.

Turning now to FIG. 3B, further details of the sleeve magnetic element 212 are described. In an embodiment, the sleeve magnetic element 212 comprises a plurality of permanent magnets 224 with their field directed radially outwards as indicated by arrows in FIG. 3B. The permanent magnets 224 may be press fit into slots in the sleeve magnetic element 212. The permanent magnets 224 may be secured with attachment hardware such as screws, brackets, retaining rings, or other attachment hardware. The permanent magnets 224 may be secured with glue, epoxy, or other adhesives. In an embodiment, the permanent magnets 224 may all be disposed with their north magnetic field directed radially outwards or may all be disposed with their south magnetic field directed radially outwards. While illustrated in FIG. 3B as rectangular in shape, the permanent magnets 224 may take on a variety of different form factors. The permanent magnets 224 may be circular cylinders. The permanent magnets 224 may be triangular cylinders.

Figure 3C:
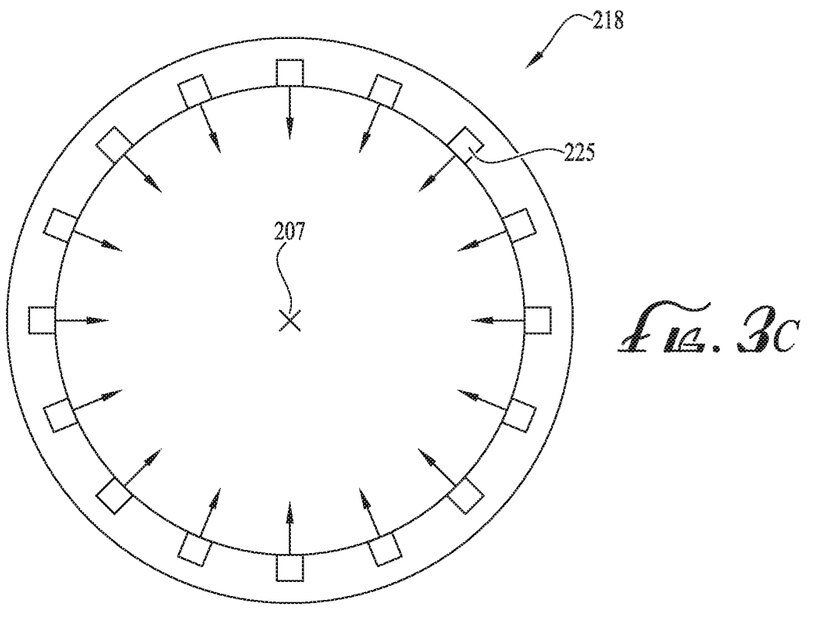
FIG. 3C is a cross-section view of a magnetic element of a hybrid magnetic radial bearing bushing according to an embodiment of the disclosure.

Turning now to FIG. 3C, further details of the bushing magnetic element 218 are described. In an embodiment, the bushing magnetic element 218 comprises a plurality of permanent magnets 225 with their field directed radially inwards as indicated by arrows in FIG. 3C. The permanent magnets 225 may be press fit into slots in the bushing magnetic element 218. The permanent magnets 225 may be secured with attachment hardware such as screws, brackets, retaining rings, or other attachment hardware. The permanent magnets 225 may be secured with glue, epoxy, or other adhesives. In an embodiment, the permanent magnets 225 may all be disposed with their north magnetic field directed radially inwards or may all be disposed with their south magnetic field directed radially inwards. In an embodiment where the permanent magnets 224 are disposed with their north magnetic fields directed radially outwards, the permanent magnets 225 of that embodiment are disposed with their north magnetic fields directed radially inwards. In an embodiment where the permanent magnets 224 are disposed with their south magnetic fields directed radially outwards, in that embodiment the permanent magnets 225 are disposed with their south magnetic fields directed radially inwards. Because like poles of permanent magnets repel, forces between the permanent magnets 224 and the permanent magnets 225 operate to urge the sleeve magnetic element 212 and the bearing sleeve 206 to move so that the center axis 205 of the bearing sleeve 206 coincides with the center axis 207 of the bearing bushing 208. While illustrated in FIG. 3C as rectangular in shape, the permanent magnets 225 may take on a variety of different form factors. The permanent magnets 225 may be circular cylinders. The permanent magnets 225 may be triangular cylinders.

With reference to both FIG. 3B and FIG. 3C, in an embodiment the permanent magnets 224, 225 are rare earth permanent magnets. In an embodiment, the permanent magnets 224, 225 are samarium-cobalt rare earth permanent magnets. In an embodiment, the permanent magnets 224, 225 are neodymium rare earth permanent magnets. Samarium-cobalt rare earth permanent magnets may retain desirable magnetic properties better than neodymium rare earth permanent magnets in a high temperature downhole environment. Neodymium rare earth permanent magnets may provide higher magnetic force than samarium-cobalt rare earth permanent magnets when they are used in a moderate temperature downhole environment.

The permanent magnets 224, 225 produce a substantially constant magnetic field strength and may be referred to as passive magnets in contrast to other magnetic devices (e.g., an electro magnet) that may produce a controllable magnetic field strength. The permanent magnets 224, 225 may be fixed in place and can further be distinguished from permanent magnets whose position may be dynamically controlled by a feedback control loop type of control system. For this reason, in some contexts, the hybrid magnetic radial bearings taught herein may be referred to as passive hybrid magnetic radial bearings.

Figure 3D:
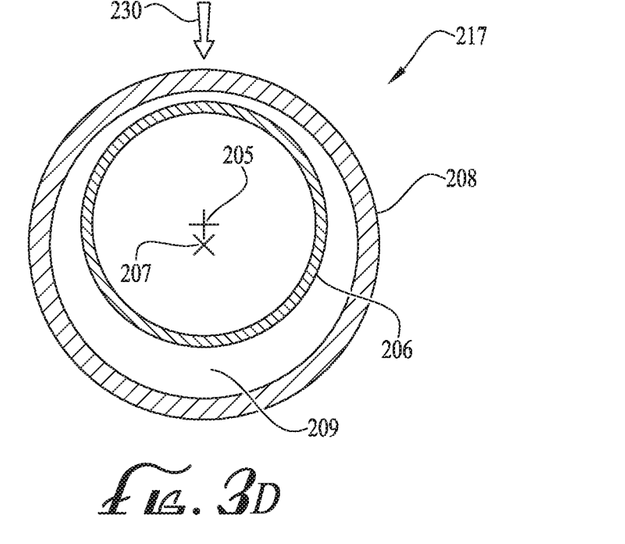
FIG. 3D is a cross-section view of a hybrid magnetic radial bearing sleeve in a first displacement position relative to a hybrid magnetic radial bearing bushing according to an embodiment of the disclosure.

Turning now to FIG. 3D, a first net magnetic force 230 is described. The first net magnetic force 230 is the sum of all the forces between the permanent magnets 224, 225 in the disposition of the bearing sleeve 206 and the bearing bushing 208 illustrated. As illustrated in FIG. 3D, the bearing sleeve 206 is not centered within the bearing bushing 208 (e.g., center axis 205 of the bearing sleeve 206 is displaced from center axis 207 of the bearing bushing 208), such that the top edge of the bearing sleeve 206 is closer to the top edge of the bearing bushing 208 than at other points around the bearing sleeve 206. In this case, the magnetic force of repulsion between permanent magnets 224, 225 at the top of the bearing sleeve 206 is greater, resulting in the first net magnetic force 230 on the bearing sleeve 206 urging the bearing sleeve 206 downwards. As the bearing sleeve 206 responds to the first net magnetic force 230, the net magnetic force decreases and may approach zero. Said in other words, the first net magnetic force 230 urges the bearing sleeve 206 (and the rotor 202 coupled to the bearing sleeve 206) to move so center axes 205 and 207 coincide.

Figure 3E:
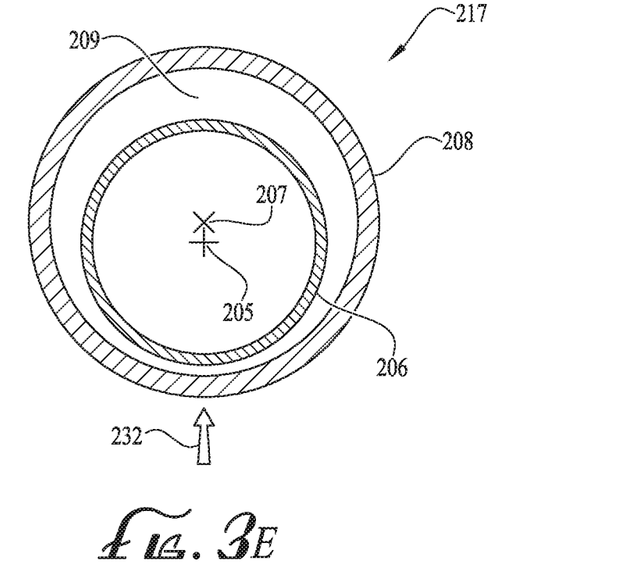
FIG. 3E is a cross-section view of a hybrid magnetic radial bearing sleeve in a second displacement position relative to a hybrid magnetic radial bearing bushing according to an embodiment of the disclosure.

Turning now to FIG. 3E, a second net magnetic force 232 is described. The second net magnetic force 232 is the sum of all the forces between the permanent magnets 224, 225 in the disposition of the bearing sleeve 206 and the bearing bushing 208 illustrated. As illustrated in FIG. 3E, the bearing sleeve 206 is not centered within the bearing bushing 208 (e.g., center axis 205 of the bearing sleeve 206 is displaced from center axis 207 of the bearing bushing 208), such that the bottom edge of the bearing sleeve 206 is closer to the bottom edge of the bearing bushing 208 than at other points around the bearing sleeve 206. In this case, the magnetic force of repulsion between permanent magnets 224, 225 at the bottom of the bearing sleeve 206 is greater, resulting in the second net magnetic force 232 on the bearing sleeve 206 urging the bearing sleeve 206 upwards. As the bearing sleeve 206 responds to the second net magnetic force 232, the net magnetic force decreases and may approach zero. Said in other words, the second net magnetic force 232 urges the bearing sleeve 206 (and the rotor 202 coupled to the bearing sleeve 206) to move so center axes 205 and 207 coincide.

Figure 3F:
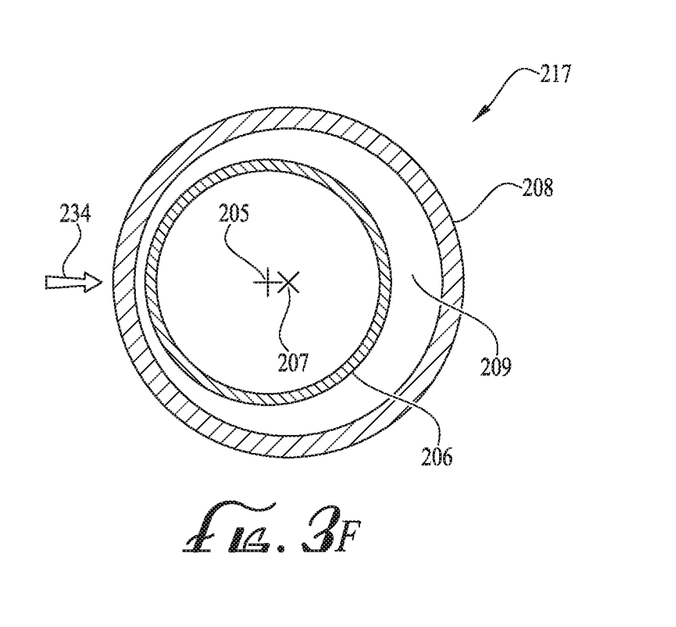
FIG. 3F is a cross-section view of a hybrid magnetic radial bearing sleeve in a third displacement position relative to a hybrid magnetic radial bearing bushing according to an embodiment of the disclosure.

Turning now to FIG. 3F, a third net magnetic force 234 is described. The third net magnetic force 234 is the sum of all the forces between the permanent magnets 224, 225 in the disposition of the bearing sleeve 206 and the bearing bushing 208 illustrated. As illustrated in FIG. 3F, the bearing sleeve 206 is not centered within the bearing bushing 208 (e.g., center axis 205 of the bearing sleeve 206 is displaced from center axis 207 of the bearing bushing 208), such that the left edge of the bearing sleeve 206 is closer to the left edge of the bearing bushing 208 than at other points around the bearing sleeve 206. In this case, the magnetic force of repulsion between permanent magnets 224, 225 at the left edge of the bearing sleeve 206 is greater, resulting in the third net magnetic force 234 on the bearing sleeve 206 urging the bearing sleeve 206 rightwards. As the bearing sleeve 206 responds to the third net magnetic force 234, the net magnetic force decreases and may approach zero. Said in other words, the third net magnetic force 234 urges the bearing sleeve 206 (and the rotor 202 coupled to the bearing sleeve 206) to move so center axes 205 and 207 coincide.

Figure 3G:
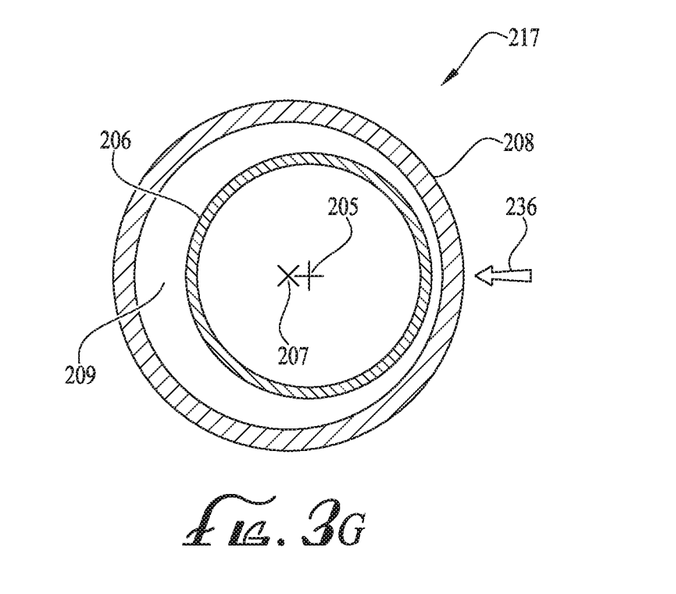
FIG. 3G is a cross-section view of a hybrid magnetic radial bearing sleeve in a fourth displacement position relative to a hybrid magnetic radial bearing bushing according to an embodiment of the disclosure.

Turning now to FIG. 3G, a fourth net magnetic force 236 is described. The fourth net magnetic force 234 is the sum of all the forces between the permanent magnets 224, 225 in the disposition of the bearing sleeve 206 and the bearing bushing 208 illustrated. As illustrated in FIG. 3G, the bearing sleeve 206 is not centered within the bearing bushing 208 (e.g., center axis 205 of the bearing sleeve 206 is displaced from center axis 207 of the bearing bushing 208), such that the right edge of the bearing sleeve 206 is closer to the right edge of the bearing bushing 208 than at other points around the bearing sleeve 206. In this case, the magnetic force of repulsion between permanent magnets 224, 225 at the right edge of the bearing sleeve 206 is greater, resulting in the fourth net magnetic force 236 on the bearing sleeve 206 urging the bearing sleeve 206 leftwards. As the bearing sleeve 206 responds to the fourth net magnetic force 236, the net magnetic force decreases and may approach zero. Said in other words, the fourth net magnetic force 236 urges the bearing sleeve 206 (and the rotor 202 coupled to the bearing sleeve 206) to move so center axes 205 and 207 coincide. It will be appreciated by one skilled in the art that other dispositions where the bearing sleeve 206 is offset within the bearing bushing 208 will be associated with like net magnetic forces that will urge the bearing sleeve 206 back into a centered position within the bearing bushing 208, where the center axis 205 of the bearing sleeve 206 will coincide with the center axis 207 of the bearing bushing 208.

Figure 4:
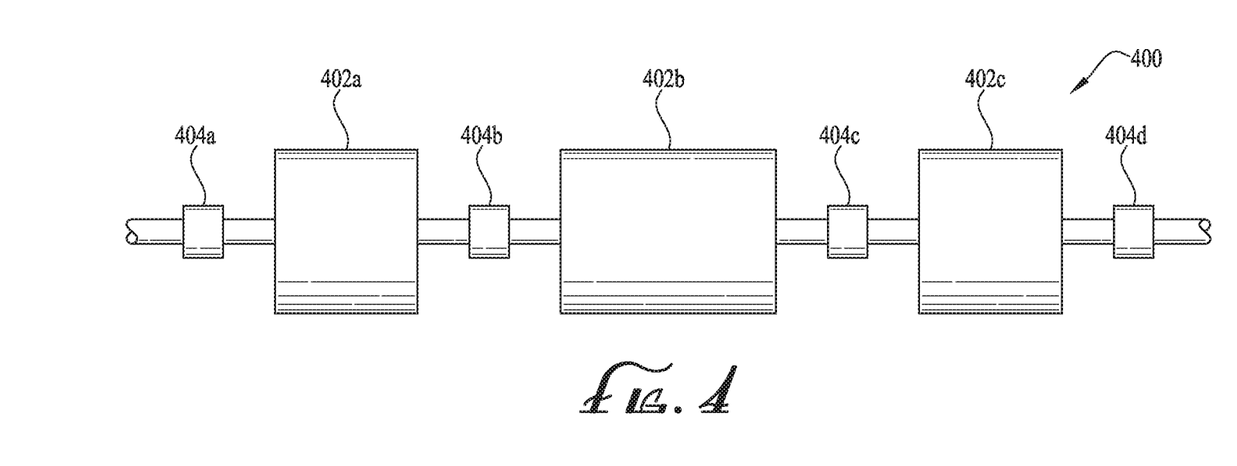
FIG. 4 is an illustration of hybrid magnetic radial bearings in a multi-rotor electric motor according to an embodiment of the disclosure.

Turning now to FIG. 4, a series of electric motor sections 400 is described. In an embodiment, the electric motor sections 400 may comprise a first electric motor section 402, a second electric motor section 402b, and a third electric motor section 402c. In another embodiment, the electric motor sections 400 may comprise two motor sections 402. In another embodiment, the electric motor sections 400 may comprise more than three motor sections 402. Each motor section 402 may comprise a stator portion and a rotor portion. The motor sections 402 may be mechanically coupled to each other via a drive shaft (e.g., drive shaft 203). Each motor section 402 outputs mechanical torque to the common drive shaft, and hence the common drive shaft may transfer the sum of mechanical torque produced by the electric motor sections 402 to another device such as the pump 116. The electric motor sections 402 may form a part of the electric motor 110 and/or electric motor 200 described above.

The electric motor sections 402 are radially stabilized by hybrid magnetic radial bearings 404, for example a first hybrid magnetic radial bearing 404a, a second hybrid magnetic radial bearing 404b, a third hybrid magnetic radial bearing 404c, and a fourth hybrid magnetic radial bearing 404d. Each hybrid magnetic radial bearing 404 may be formed by the combination of the bearing sleeve 206 and the bearing bushing 208 described above with reference to FIG. 3A, FIG. 3B, FIG. 3C, FIG. 3D, FIG. 3E, FIG. 3F, and FIG. 3G. It is understood that some of the electric motor sections 402 may be located in a single housing. The bearing sleeve 206 may be press fitted onto the drive shaft 203, and the bearing bushing 208 may be retained by the housing of the electric motor 400.

In an embodiment, the seal unit 112 of the ESP assembly 106 may have one or more hybrid magnetic radial bearings 217 as described above with reference to FIG. 2, FIG. 3A, FIG. 3B, FIG. 3C, FIG. 3D, FIG. 3E, FIG. 3F, and FIG. 3G. For example the drive shaft 203 may extend through the seal unit 112 and may be radially stabilized within the seal unit 112 by one or more hybrid magnetic radial bearings 217.

Figure 5:
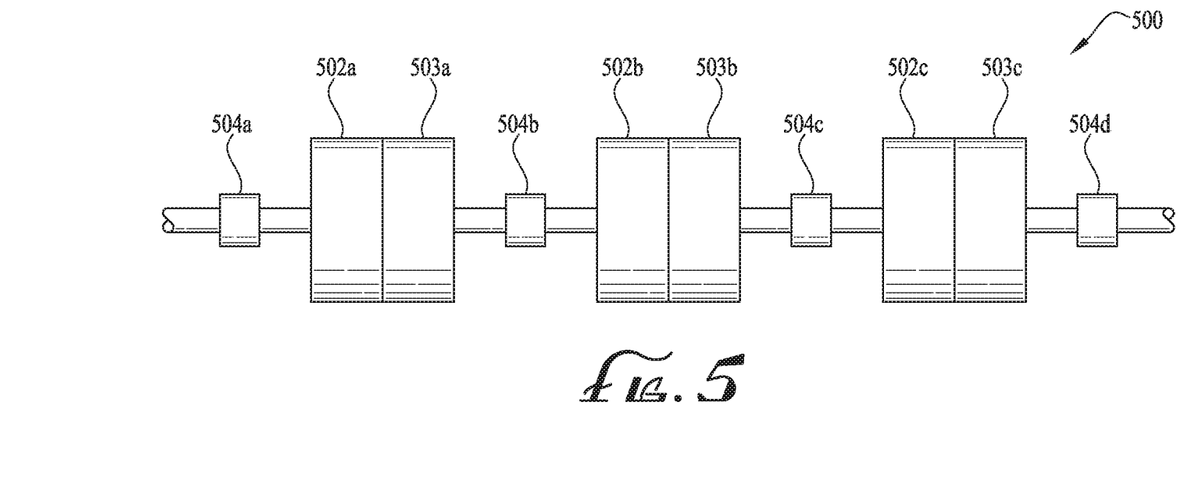
FIG. 5 is an illustration of hybrid magnetic radial bearings in a multi-stage centrifugal pump according to an embodiment of the disclosure.

Turning now to FIG. 5, a series of centrifugal pump stages 500 radially stabilized by hybrid magnetic radial bearings 504 are illustrated. Each pump stage comprises an impeller portion 503 and a diffuser portion 502. The illustration of impellers and diffusers in FIG. 5 is abstract. As is known, impellers and diffusers are complex mechanical structures, and impellers are at least partially nested inside of diffusers. The abstract representation of FIG. 5, however suffices to illustrate the use of hybrid magnetic bearings 504 to radially stabilize the pump stages 500. While three impeller/diffuser stages are illustrated in FIG. 5, in an embodiment, the centrifugal pump stages 500 may comprise any number of impeller-diffuser stages. The centrifugal pump stages 500 may be a part of the centrifugal pump 116 illustrated in FIG. 1.

The centrifugal pump stages 502, 503 are radially stabilized by hybrid magnetic radial bearings 504, for example a first hybrid magnetic radial bearing 504a, a second hybrid magnetic radial bearing 504b, a third hybrid magnetic radial bearing 504c, and a fourth hybrid magnetic radial bearing 504d. Each hybrid magnetic radial bearing 504 may be formed by the combination of the bearing sleeve 206 and the bearing bushing 208 described above with reference to FIG. 3A, FIG. 3B, FIG. 3C, FIG. 3D, FIG. 3E, FIG. 3F, and FIG. 3G. It is understood that some of the centrifugal pump stages 502/503 may be located in a single housing. The bearing sleeves 206 may be press fitted onto the drive shaft 203, and the bearing bushings 208 may be press fitted into the diffusers 502 or retained by the housing of the pump 116.

Figure 6:
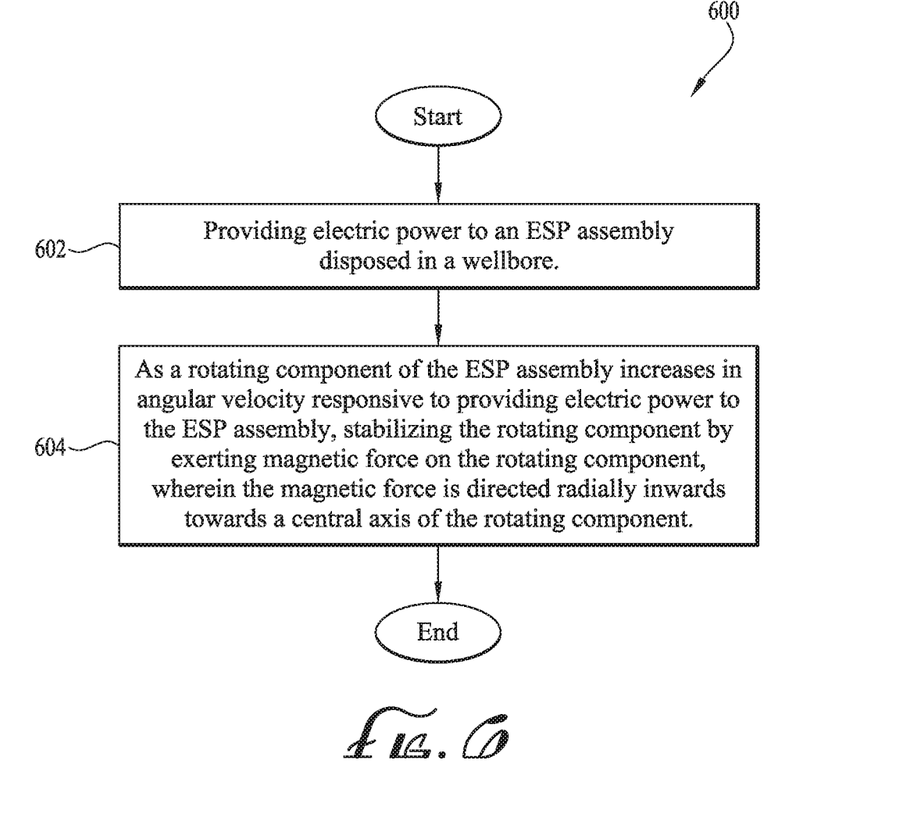
FIG. 6 is a flow chart of a method according to an embodiment of the disclosure.

Turning now to FIG. 6, a method 600 is described. In an embodiment, the method 600 is a method of radially stabilizing in an electric submersible pump (ESP) assembly. At block 602, the method 600 comprises providing electric power to an ESP assembly disposed in a wellbore. At block 604, the method 600 comprises, as a rotating component of the ESP assembly increases in angular velocity responsive to providing electric power to the ESP assembly, stabilizing the rotating component by exerting magnetic force on the rotating component, wherein the magnetic force is directed radially inwards towards a central axis of the rotating component. In an embodiment, the method comprises stabilizing the rotating component in part by exerting fluid film force on the rotating component. In an embodiment, exerting the magnetic force provides coarse stabilization of the rotating component, and exerting fluid film force provides fine stabilization of the rotating component.

Figure 7:
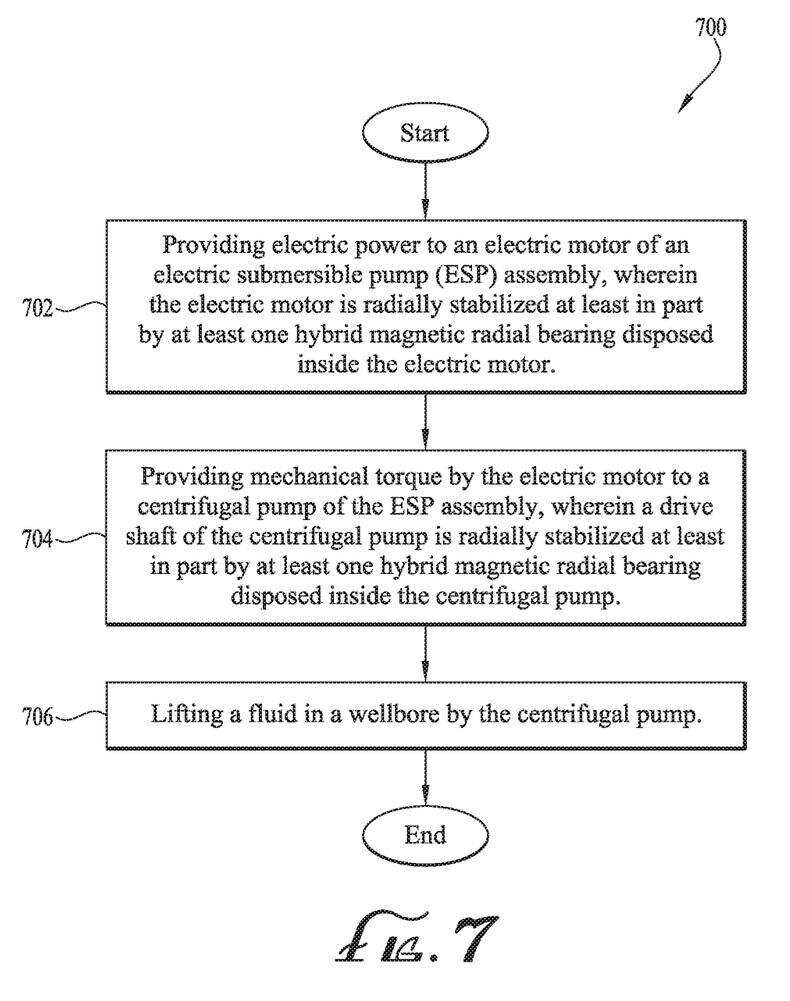
FIG. 7 is a flow chart of another method according to an embodiment of the disclosure.

Turning now to FIG. 7, a method 700 is described. In an embodiment, the method 700 comprises a method of lifting fluid in a wellbore. The fluid lifted in the wellbore may be a hydrocarbon or may be water or may be both. At block 702, the method 700 comprises providing electric power to an electric motor of an electric submersible pump (ESP) assembly, wherein the electric motor is radially stabilized at least in part by at least one hybrid magnetic radial bearing disposed inside the electric motor. In an embodiment, the electric motor is radially stabilized by magnetic force applied by a magnetic element of the at least one hybrid magnetic radial bearing disposed inside the electric motor and by fluid film force applied by a sleeve and a bushing of the at least one hybrid magnetic radial bearing disposed inside the electric motor interacting with a fluid provided inside the electric motor. In an embodiment, the electric motor comprises a plurality of rotor and stator stages and the electric motor is stabilized by a plurality of hybrid magnetic radial bearings including a hybrid magnetic radial bearing between adjacent rotor and stator stages.

At block 704, the method 700 comprises providing mechanical torque by the electric motor to a centrifugal pump of the ESP assembly, wherein a drive shaft of the centrifugal pump is radially stabilized at least in part by at least one hybrid magnetic radial bearing disposed inside the centrifugal pump. In an embodiment, the drive shaft of the centrifugal pump is radially stabilized by magnetic force applied by a magnetic element of the at least one hybrid magnetic radial bearing disposed inside the centrifugal pump and by fluid film force applied by a sleeve and a bushing of the at least one hybrid magnetic radial bearing disposed inside the centrifugal pump interacting with the fluid. In an embodiment, the magnetic element of the bearing disposed inside the centrifugal pump comprises a plurality of permanent magnets. In an embodiment, the centrifugal pump comprises a plurality of pump stages.

At block 706, the method 700 comprises lifting a fluid in a wellbore by the centrifugal pump. In an embodiment, the ESP assembly comprises a seal unit having a drive shaft that is radially stabilized at least in part by at least one hybrid magnetic radial bearing disposed inside the seal unit, wherein the drive shaft of the seal unit provides the mechanical torque from the electric motor to the drive shaft of the centrifugal pump.

The hybrid magnetic radial bearings described and taught herein may provide a number of advantages in an ESP assembly. It can extend life of the ESP assembly because it reduces radial bearing wear that would otherwise occur, for example wear that would be greater during rapid angular acceleration during electric motor turn on due to heavy side loads. This radial bearing wear is reduced because the magnetic radial forces provided in the hybrid magnetic radial bearings augment and support the fluid film forces in providing radial stabilization. The hybrid magnetic radial bearings can be made with a greater gap between the surfaces of the bearing sleeve and the bearing bushing, which can reduce bearing wear in the presence of abrasive particle which are common in fluid being lifted by a centrifugal pump. The hybrid magnetic radial bearings can be made with relaxed tolerances or specifications for surface roughness, which can reduce costs of manufacturing the hybrid magnetic radial bearings. This increased surface roughness and increased gap between bearing surfaces can contribute to cooling the bearings which can extend the life of the hybrid magnetic radial bearings and/or allow use of the hybrid magnetic radial bearings in hotter downhole environments.

Additional Disclosure

The following are non-limiting, specific aspects in accordance with the present disclosure:

A first embodiment, which is an electric submersible pump (ESP) assembly, comprising an electric motor, a centrifugal pump, and a hybrid magnetic radial bearing, wherein the hybrid magnetic radial bearing is disposed inside the electric motor or disposed inside the centrifugal pump.

A second embodiment, which is the ESP assembly of the first embodiment, wherein the hybrid magnetic radial bearing comprises a sleeve that is coupled to a drive shaft of the ESP assembly and a bushing that is coupled to a housing of the ESP assembly, the sleeve comprises a sleeve magnetic element, the bushing comprises a bushing magnetic element, and a magnetic field of the sleeve magnetic element is directed opposite to a magnetic field of the bushing magnetic element.

A third embodiment, which is the ESP assembly of the second embodiment, wherein the sleeve magnetic element comprises a plurality of permanent magnets and the bushing magnetic element comprises a plurality of permanent magnets.

A fourth embodiment, which is the ESP assembly of the third embodiment, wherein the permanent magnets of both the sleeve magnetic element and the bushing magnetic element are rare earth permanent magnets.

A fifth embodiment, which is the ESP assembly of the fourth embodiment, wherein the rare earth permanent magnets comprise samarium-cobalt rare earth magnets or neodymium rare earth magnets.

A sixth embodiment, which is the ESP assembly of any of the second, the third, the fourth, or the fifth embodiment, wherein an inside diameter of the bushing of the hybrid magnetic radial bearing is between 3 mils and 10 mils greater than an outside diameter of the sleeve of the hybrid magnetic radial bearing.

A seventh embodiment, which is the ESP assembly of any of the second, the third, the fourth, the fifth, or the sixth embodiment, wherein an outer surface of the sleeve of the hybrid magnetic radial bearing and an inner surface of the bushing of the hybrid magnetic radial bearing have a roughness of between 8 micro inches and 22 micro inches.

An eighth embodiment, which is the ESP assembly of any of the first, the second, the third, the fourth, the fifth, the sixth, or the seventh embodiment, wherein the hybrid magnetic radial bearing is disposed in the electric motor.

A ninth embodiment, which is the ESP assembly of any of the first, the second, the third, the fourth, the fifth, the sixth, or the seventh embodiment, wherein the hybrid magnetic radial bearing is disposed in the centrifugal pump.

A tenth embodiment, which is the ESP assembly of any of the first, the second, the third, the fourth, the fifth, the sixth, the seventh, the eighth, or the ninth embodiment, further comprising a seal unit and a second hybrid magnetic radial bearing, wherein the second hybrid magnetic radial bearing is disposed in the seal unit.

An eleventh embodiment, which is a method of radially stabilizing in an electric submersible pump (ESP) assembly, comprising providing electric power to an ESP assembly disposed in a wellbore, and as a rotating component of the ESP assembly increases in angular velocity responsive to providing electric power to the ESP assembly, stabilizing the rotating component by exerting magnetic force on the rotating component, wherein the magnetic force is directed radially inwards towards a central axis of the rotating component.

A twelfth embodiment, which is the method of the eleventh embodiment, comprising stabilizing the rotating component in part by exerting fluid film force on the rotating component.

A thirteenth embodiment, which is a method of lifting fluid in a wellbore, comprising providing electric power to an electric motor of an electric submersible pump (ESP) assembly, wherein the electric motor is radially stabilized at least in part by at least one hybrid magnetic radial bearing disposed inside the electric motor, providing mechanical torque by the electric motor to a centrifugal pump of the ESP assembly, wherein a drive shaft of the centrifugal pump is radially stabilized at least in part by at least one hybrid magnetic radial bearing disposed inside the centrifugal pump, and lifting a fluid in a wellbore by the centrifugal pump.

A fourteenth embodiment, which is the method of the thirteenth embodiment, wherein the fluid lifted in the wellbore is a hydrocarbon or water.

A fifteenth embodiment, which is the method of any of the thirteenth, or the fourteenth embodiment, wherein the drive shaft of the centrifugal pump is radially stabilized by magnetic force applied by a magnetic element of the at least one hybrid magnetic radial bearing disposed inside the centrifugal pump and by fluid film force applied by a sleeve and a bushing of the at least one hybrid magnetic radial bearing disposed inside the centrifugal pump interacting with the fluid.

A sixteenth embodiment, which is the method of the fifteenth embodiment, wherein the magnetic element comprises a plurality of permanent magnets.

A seventeenth embodiment, which is the method of any of the thirteenth, the fourteenth, the fifteenth, or the sixteenth embodiment, wherein a drive shaft of a seal unit of the ESP is radially stabilized at least in part by at least one hybrid magnetic radial bearing disposed inside the seal unit, wherein the drive shaft of the seal unit provides the mechanical torque from the electric motor to the drive shaft of the centrifugal pump.

An eighteenth embodiment, which is the method of any of the thirteenth, the fourteenth, the fifteenth, the sixteenth, or the seventeenth embodiment, wherein the electric motor is radially stabilized by magnetic force applied by a magnetic element of the at least one hybrid magnetic radial bearing disposed inside the electric motor and by fluid film force applied by a sleeve and a bushing of the at least one hybrid magnetic radial bearing disposed inside the electric motor interacting with a fluid provided inside the electric motor.

A nineteenth embodiment, which is the method of any of the thirteenth, the fourteenth, the fifteenth, the sixteenth, the seventeenth, or the eighteenth embodiment, wherein the electric motor comprises a plurality of rotor and stator sections and the electric motor is stabilized by a plurality of hybrid magnetic radial bearings including a hybrid magnetic radial bearing between adjacent rotor and stator sections.

A twentieth embodiment, which is the method of any of the thirteenth, the fourteenth, the fifteenth, the sixteenth, the seventeenth, the eighteenth, or the nineteenth embodiment, wherein the centrifugal pump comprises a plurality of pump stages.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An electric submersible pump (ESP) assembly, comprising:
    an electric motor;
    a centrifugal pump; and
    a hybrid magnetic radial bearing that comprises a sleeve that is coupled to a drive shaft of the ESP assembly and a bushing that is coupled to a housing of the ESP assembly, wherein the hybrid magnetic radial bearing is disposed inside the electric motor or disposed inside the centrifugal pump
        wherein the sleeve comprises a sleeve magnetic element,
        wherein the bushing comprises a bushing magnetic element,
        wherein a magnetic field of the sleeve magnetic element is directed opposite to a magnetic field of the bushing magnetic element, and
        wherein an outer surface of the sleeve of the hybrid magnetic radial bearing and an inner surface of the bushing of the hybrid magnetic radial bearing have a roughness of between 8 micro inches and 22 micro inches that provide radially stabilizing fluid film forces during operation of the ESP assembly.

2. The ESP assembly of claim 1, wherein the sleeve magnetic element comprises a plurality of permanent magnets and the bushing magnetic element comprises a plurality of permanent magnets.

3. The ESP assembly of claim 2, wherein the permanent magnets of both the sleeve magnetic element and the bushing magnetic element are rare earth permanent magnets.

4. The ESP assembly of claim 3, wherein the rare earth permanent magnets comprise samarium-cobalt rare earth magnets or neodymium rare earth magnets.

5. The ESP assembly of claim 1, wherein an inside diameter of the bushing of the hybrid magnetic radial bearing is between 3 mils and 10 mils greater than an outside diameter of the sleeve of the hybrid magnetic radial bearing.

6. The ESP assembly of claim 1, wherein the hybrid magnetic radial bearing is disposed in the electric motor.

7. The ESP assembly of claim 1, wherein the hybrid magnetic radial bearing is disposed in the centrifugal pump.

8. The ESP assembly of claim 1, further comprising a seal unit and a second hybrid magnetic radial bearing, wherein the second hybrid magnetic radial bearing is disposed in the seal unit.

9. The ESP assembly of claim 1, wherein the outer surface of the sleeve of the hybrid magnetic radial bearing and the inner surface of the bushing of the hybrid magnetic radial bearing have a surface smoothness of about 20 millionths of an inch of surface variation.

10. The ESP assembly of claim 2, wherein the plurality of permanent magnets of the sleeve magnetic element are fitted into slots in the sleeve magnetic element and the plurality of permanent magnets of the bushing magnetic element are fitted into slots in the bushing magnetic element.

11. A method of radially stabilizing in an electric submersible pump (ESP) assembly, comprising:
    providing electric power to an ESP assembly disposed in a wellbore; and
    as a rotating component of the ESP assembly increases in angular velocity responsive to providing electric power to the ESP assembly, radially stabilizing the rotating component by a hybrid magnetic radial bearing within the ESP assembly, wherein the hybrid magnetic radial bearing comprises a sleeve having a sleeve magnetic element and a bushing having a bushing magnetic element, wherein the sleeve is coupled to a drive shaft of the rotating component and the bushing is coupled to a housing of the ESP assembly, wherein a magnetic field of the sleeve magnetic element is directed opposite to a magnetic field of the bushing magnetic element to provide magnetic stabilizing force, and wherein an outer surface of the sleeve of the hybrid magnetic radial bearing and an inner surface of the bushing of the hybrid magnetic radial bearing have a roughness of between 8 micro inches and 22 micro inches that provide radially stabilizing fluid film force.

12. The method of claim 11, wherein the outer surface of the sleeve of the hybrid magnetic radial bearing and the inner surface of the bushing of the hybrid magnetic radial bearing have a surface smoothness of about 20 millionths of an inch of surface variation.

13. A method of lifting fluid in a wellbore, comprising:
providing electric power to an electric motor of an electric submersible pump (ESP) assembly, wherein the electric motor is radially stabilized at least in part by at least one hybrid magnetic radial bearing disposed inside the electric motor;
providing mechanical torque by the electric motor to a centrifugal pump of the ESP assembly, wherein a drive shaft of the centrifugal pump is radially stabilized at least in part by at least one hybrid magnetic radial bearing disposed inside the centrifugal pump, wherein the hybrid magnetic radial bearing comprises a sleeve having a sleeve magnetic element and a bushing having a bushing magnetic element, wherein the sleeve is coupled to the drive shaft of the centrifugal pump and the bushing is coupled to a housing of the centrifugal pump, wherein a magnetic field of the sleeve magnetic element is directed opposite to a magnetic field of the bushing magnetic element to provide magnetic stabilizing force, and wherein an outer surface of the sleeve of the hybrid magnetic radial bearing and an inner surface of the bushing of the hybrid magnetic radial bearing have a roughness of between 8 micro inches and 22 micro inches that provide radially stabilizing fluid film force; and
lifting a fluid in a wellbore by the centrifugal pump.

14. The method of claim 13, wherein the fluid lifted in the wellbore is a hydrocarbon or water.

15. The method of claim 13, wherein the magnetic element comprises a plurality of permanent magnets.

16. The method of claim 13, wherein a drive shaft of a seal unit of the ESP is radially stabilized at least in part by at least one hybrid magnetic radial bearing disposed inside the seal unit, wherein the drive shaft of the seal unit provides the mechanical torque from the electric motor to the drive shaft of the centrifugal pump.

17. The method of claim 13, wherein the electric motor is radially stabilized by magnetic force applied by a magnetic element of the at least one hybrid magnetic radial bearing disposed inside the electric motor and by fluid film force applied by a sleeve and a bushing of the at least one hybrid magnetic radial bearing disposed inside the electric motor interacting with a fluid provided inside the electric motor.

18. The method of claim 13, wherein the electric motor comprises a plurality of rotor and stator sections and the electric motor is stabilized by a plurality of hybrid magnetic radial bearings including a hybrid magnetic radial bearing between adjacent rotor and stator sections.

19. The method of claim 13, wherein the centrifugal pump comprises a plurality of pump stages.

20. The method of claim 13, wherein the outer surface of the sleeve of the hybrid magnetic radial bearing and the inner surface of the bushing of the hybrid magnetic radial bearing have a surface smoothness of about 20 millionths of an inch of surface variation.

* * * * *